Jan. 9, 1940.    P. E. CHAPMAN    2,186,820
COIL WINDING MACHINE
Filed April 29, 1935    2 Sheets-Sheet 1

INVENTOR
Penrose E Chapman

Jan. 9, 1940.                    P. E. CHAPMAN                    2,186,820
                              COIL WINDING MACHINE
              Filed April 29, 1935                  2 Sheets-Sheet 2
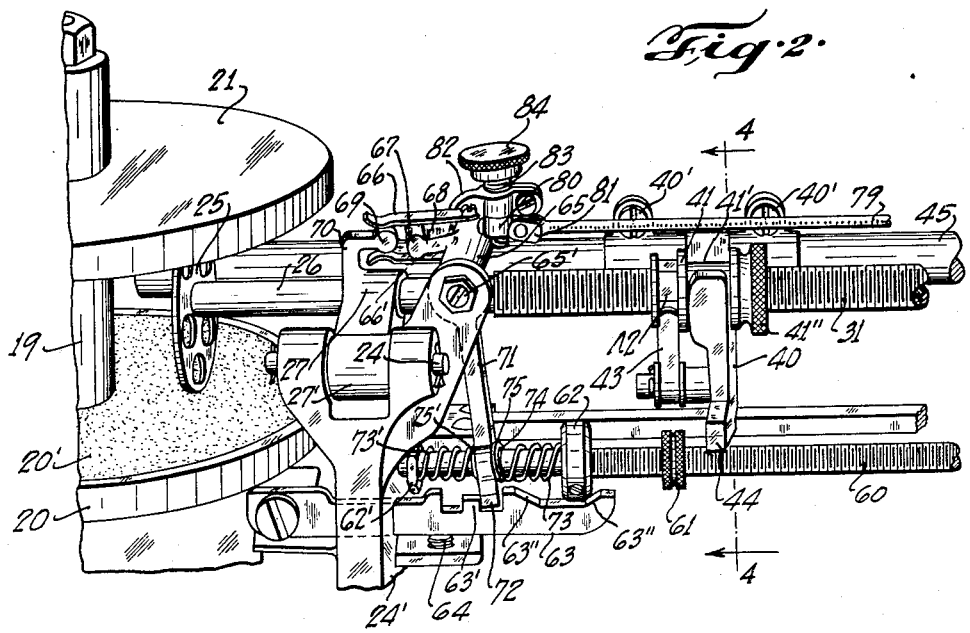
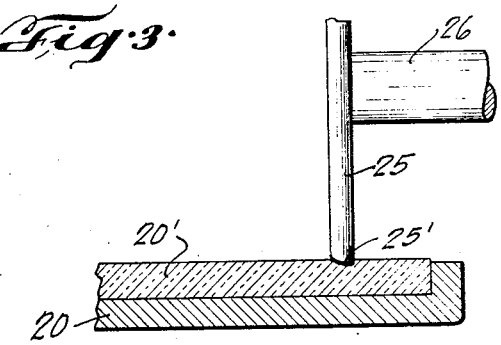
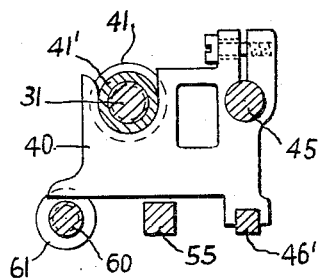
INVENTOR
Penrose E. Chapman Patented Jan. 9, 1940

2,186,820

UNITED STATES PATENT OFFICE 2,186,820

COIL WINDING MACHINE

Penrose E. Chapman, St. Louis, Mo.

Application April 29, 1935, Serial No. 18,800

16 Claims. (Cl. 242—9)

The object of my invention is to make a coil winding machine that will be quickly and continuously adjustable within its capacity for all the size variations that occur in winding coils.

That no adjustment shall interfere with any other adjustment.

That it shall be capable of distributing the windings longitudinally in layers or random.

The advantage of these features will be obvious.

In the drawings:

Fig. 2 shows details of the reverse mechanism.

Fig. 3 is a detail of the friction roller discs.

Fig. 4 is a cross section of the traverse carriage and associated longitudinal elements.

Figure 1:
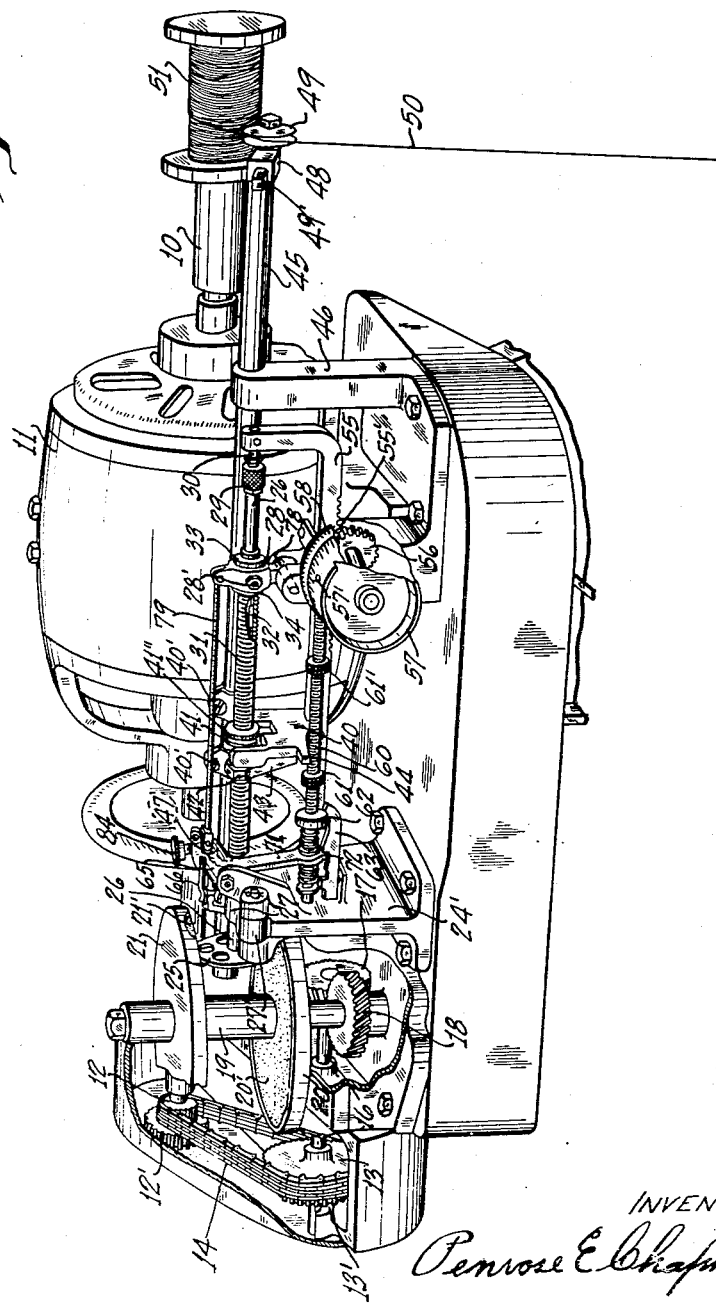
Fig. 1 is a general perspective partly in section.

To accomplish my object, a winding spindle 10 may be mounted in any suitable fashion and driven by any suitable source of power. I prefer to use an electric motor 11 to mount and drive the said spindle.

The word wire will herein be used to include all forms of elongated material that may be wound in coils, or rolls.

Means for causing the winding wire to traverse the length of the coil are driven from the said spindle 10 by any suitable form of coupling. In some machines changeable gearing is desirable for or as part of said coupling. Many means for doing this may be employed, as cone pulleys and belt, pick off or quick change gears, cone sprockets with chain, or other equivalent. Sprockets and shiftable chain were preferred in the machine illustrated. The cone sprockets 12 and 12' are mounted on an extension of the spindle 10. Mating sprockets 13 and 13' are mounted on jack shaft 16. The chain 14 may be placed on either sprockets 12 and 13 or 12' and 13' thus altering said driving ratio.

A jack shaft 16 carrying the sprockets 13 and 13' drives a disc-roller feeding element or assembly through gear 17 which it carries and which meshes with a driven gear 18 that is secured to the spindle 19 which in turn carries a pair of friction discs 20 and 21.

Playing between these discs is a wheel or roller 25 adapted to be frictionally driven by either disc according to which one it may be pressed against, thus providing means for reversing.

Disc-roller drives usually have the roller faced with the softer or friction material and the discs hard. This arrangement makes calibration of the device impractical as when the roll wears, or if rubber tired the rubber compresses, the ratio at a given setting changes. I prefer to line the discs 20 and 21 with rubber or other friction faces as 20' and 21' and make the roller 25 relatively hard, as by doing this the calibration is independent of the wear and/or compression of the friction surface.

Contact edge 25' of roller 25 (shown enlarged in Fig. 3) would be most perfect if it were possible to make discs 20, 21 and roller 25 cones, the apexes of which would be at the intersection of their axes. Owing to the fact that the preferred liners 20', 21' of the discs 20, 21 are rubber and will therefore form themselves slightly to the contour of the roller 25 it is possible to make the face 25' of said roller conical so as to simulate conical action, and thereby reduce the differential slippage that must occur where a straight faced roller rolls against a revolving disc. I therefore in addition to slightly rounding the corners of the roll face 25' or roller 25 to prevent cutting, give it a conical tread.

The roller 25 is supported by a shaft 26 that is carried by bearings 27—28. The end thrust of the roller 25 and its shaft 26 is taken up by the ball and socket joint 29 which is connected through link 30 to an adjusting mechanism described hereinafter.

To render the adjustment of the roller 25 with reference to the discs 20 and 21 independent of other functions I prefer to mount a lead screw 31 as a quill upon said shaft 26, keying it to the said shaft by any suitable method as key 32.

While the bearing 28 supports shaft 26, radially only, it is mounted to act as a thrust bearing for the threaded quill 31. Collars 33 secured to the said lead screw transmit the thrust strain to sleeve bearing 34.

The assembly 40 to 45 may be considered a traverse carriage or elements and may include any appropriate tooling as guide 48 and sheave 49.

Working on the lead screw 31 is a carriage actuating nut 41. This nut is loosely and rotatably mounted in the traverse carriage 40 a portion of which partly encircles the said nut in the groove 41' so that a longitudinal motion only of the nut will be imparted to the said carriage. On the nut I form a holding surface 42 which may be of many types, but is shown as a polygon in this particular machine.

To prevent the nut rotating due to the action of the machine I apply to this polygon or other type surface a spring pressure such as may be applied by the spring 43. While this spring will prevent the rotation of the nut due to the operation of the machine it is so proportioned that the nut can be turned by hand, the knurled end 41'' being provided for this purpose, thus providing a spotting adjustment.

Traverse carriage 40 I prefer to clampably mount upon and secure to the adjustable traverse or carriage rod 45 which is slidably mounted in any suitable bearings as 46 and 47.

At any convenient point along its length the traverse rod 45 may carry any suitable tooling for guiding the wire 50, as guide sheave 49 whose supporting shank 49' is shown secured in the coupling or tool post 48 upon said rod 45. The wire 50 passes over guide sheave 49 on its way to the coil 51 being wound. Said coil is supported by the winding spindle 10.

The adjustability of the traverse rod 45 and the guide support or coupling 48 provide ample means to adjust the machine for coil size and position as is obvious.

To adjust the feed to the size of the wire to be wound I couple the roller 25 and its shaft 26 to any suitable means of adjustment as the rack and pinion motion 55', 56. In this particular machine the ball and socket joint 29, hinged link 30 and the extension of the rack 55 were selected for the said coupling.

The pinion 56 carries any suitable actuating handle as knob 57 upon and/or near which I may place calibrating scale such as 57' and 58.

In order to reverse the feed at the end of the traverse I oscillate the roller 25 from either disc 20 or 21 to the other. It is also necessary that this be done at great speed. As a convenient method of accomplishing this, I may provide a shipper rod 60 upon which may be threaded stop nuts 61 and 61'. Said shipper rod 60 is yieldably attached or coupled by means of springs 73, 73' and washers 75 to oscillating transfer element or bell crank lever 71, 65 and appurtenances. The carriage 40 actuates this shipper rod at the end of the travel by means of the actuating finger portion 44 of the carriage 40 that engages either of the said stop nuts.

Upon said shipper rod I may mount some means, as button 62, for tripping the trigger 63, spring 64 holding said trigger in position.

In order to press the roller 25 against either of the discs 20 or 21 bearing 27 which carries the roller shaft 26 is mounted in any manner that will permit it to move toward one or the other disc but not transversely. In this particular machine I have chosen to form it as part of a link with the bearing 27 at one end and a bearing 27' at the other end the latter being supported by the pin 24 which in turn is supported by any suitable framework as the bracket 24'. The oscillating or reversing motion of the roller 25 I prefer to impart by moving the bearing 27 by an oscillating transfer element, or lever, as the bell crank lever 65. In order that oscillatory motion be yieldably imparted to roller 25 it is desirable that a spring be included in its train of actuating elements. Many arrangements will do the work nicely, as a single transmission or actuating spring or a tensioned, centre stopped, pair of transmission springs such as the following:

Attached to the bearing 27 is a contact point or anvil such as the pin 69 that may be supported by any suitable means, as bracket 70. Carried by the transfer element 65 is a pair of pre-tensioned springs 66 and 66'. These springs, one of which is arranged to press up and the other down, act against pin 69. When idle both of these springs press against the spacing member 67 that is in turn carried by the finger 68 attached to the transfer element 65. These two springs 66 and 66' are so formed that they press against the spacing member 67 with about all the tension that would be required to press roll 25 against either disc 20 or 21. By this arrangement practically the full tension is applied to the roll without the initial wind up travel that would be necessary were the spring free or at 0 tension.

Bell crank 65 may be supported by any suitable means, pivot screw 65' having been used in the machine illustrated. As a portion of the said bell crank structure the arm 71 may be secured to its hub. I provided a dog 72 as part of said arm for engaging the latch 63' on the trigger 63. The latch 63' is so proportioned that when dog 72 is on one side of it the roller 25 will be held against one disc and when it is on the other side of it the roller will be held against the other disc which reverses its rotation.

To instantly change the roller from disc to disc at the end of the traverse it is necessary that the slow motion of the shipper rod 60 be translated into an instantaneous one. To accomplish this it is desirable to couple the shipper rod 60 to the transfer element or bell crank 65 with another pair of transmission springs that are tensioned and centre stopped, although one spring will do the work nicely. Helical springs as 73, 73', Fig. 2, are preferable here. They are freely mounted over the shipper rod 60, and abut against suitable shoulders as nuts 62 and 62' carried by said shipper rod.

On their other ends these springs abut against washers 75 and 75' which in turn abut against collar 74 on said shipper rod 60 and hold said springs under tension.

Between the said washers 75 and 75' the arm 71 of the bell crank 65 plays in such a manner that when the shipper rod 60 is moved one of the springs 73 or 73' will press its washer against said arm 71 the other spring being rendered inactive because its tension is taken against the collar 74 through its washer 75 or 75'. Arm 71 being completely released from the tension of said spring which is also carried beyond the travel of said arm. The arm will however be retained in position as it is locked against trigger stop or latch 63' until the trip button 62 contacts with one of the trip faces 63" when said trigger and latch 63' will thereby be pressed away from the dog 72 so as to release it, whereupon the acting spring 73 or 73' snaps the dog across the trigger latch 63' and in doing so moves the roller 25 from one of the discs 20 or 21 to the other, reversing the direction of the feed, the structure being so proportioned that the acting spring will hold the dog 72 until after the trigger latch 63 comes back into position as the shipper rod returns, and locks it. This motion is reversed at the other end of the traverse.

Owing to the fact that successive layers of wire are of necessity right and left hand spirals, and to take up any slack in the mechanism, in winding some coils it is highly desirable that at the moment of reversing the feed to wind the succeeding layer the feed roll supported by the carriage be given an initial motion usually as a quick start back, independent of the normal action of the lead screw 31. As this initial motion should occur simultaneously with the reversal of the lead screw it is convenient to accomplish this in connection with the motion of the rocker arm 65. On some sizes of wire and coils this start back is very desirable. On others it should be of less magnitude or vanish entirely.

In order to accomplish this initial motion I prefer to move the lead screw 31 longitudinally which of course will move the carriage 40 and its appurtenances with it. It would be therefore quite convenient to actuate the said lead screw with the aid of the bearing 28 which is the thrust bearing of the said screw.

To accomplish this I may pivotally mount the said bearing upon the lever 78 which is pivoted to the frame work at its lower end, secured to bearing 28 by the trunnion 28' and in turn connected to and actuated by the bell crank 65 through the connecting rod 79. Connecting rod 79 is secured to nut 80 by any flexible means as clevis 81. This nut is coupled to the bell crank 65 by means of the bracket 82 thereon and the screw 83. Turning this screw 83 by means of its head 84 will either move the nut up or down. In its lower position it may be directly in line with the axis of the bell crank 65 and would therefore impart no motion through the connecting rod 79 lever 78 bearing 28 to the lead screw 31. If however this nut is elevated by means of this screw 83 it becomes a lever and will impart a motion through the connections just described to the lead screw 31, carriage 40 and its appurtenances.

In operation the element to be wound is secured to the spindle 10 by any suitable means. The feed sheave 49 is adjusted to the diameter of the work by means of the guide support 48. The stop nuts 61 and 61' are screwed back far enough to provide ample traverse, the machine is revolved by means of the motor until the carriage approaches one end of its travel whereupon the carriage rod 45 is unclamped from the carriage and moved so that the bottom of the groove in the guide sheave 49 is approximately in line with the end of the element to be wound. Any angular adjustment of the guide sheave 49 is accomplished by turning the carriage rod 45, which is then reclamped to the carriage by means of screws 41'. In this position the appropriate stop nut as 61 or 61' is screwed up until the trigger 63 releases the dog 72, at the end of arm 71 of bell crank 65, which is then snapped over into the reverse position shifting the roll 25 from one disc to the other which reverses the feed as has been previously described. The machine is again revolved until the guide sheave 49 is in line with the reverse end of the element to be wound. The other pair of stop nuts are screwed up until the trigger permits the bell crank to snap into reverse position.

If the wire and package are of such size that the action of the start back is desirable the screw 83 is turned by its head 84 so that the nut 80 is moved from the neutral or lower position to an appropriate upper one which will cause the carriage to start back at the moment the bell crank snaps over as has been previously explained.

To set the pitch or feed for the size of wire the size knob 57 is turned till the index 57' or 58 (if any) indicates that the mechanism is set for the size wire to be wound. Turning this size knob moves the roller 25 radially along the discs 20, 21 by the mechanism that has been explained changing the speed of the lead screw 31 and its appurtenances.

As it is not possible to provide sufficient variation in the disc-roller elements for all the sizes of wire that may be appropriately wound on one machine a selection of the desired train of actuating gearing as 12, 13, or 12', 13', is then made and it is coupled up as by placing chain 14 thereon.

The carriage is set at the desired starting point, the wire 50 threaded around the feed sheave 49, secured to the element to be wound and the machine started. If there should be an error in the selected pitch or rate of feed the size knob 57 is rotated enough to bring the feed and the diameter of wire into agreement. This will leave an accumulated error which is compensated for by manually revolving the carriage nut 41 until the feed sheave lines up with the work. When the carriage reaches the end of its travel the reverse elements trip and it starts back as has been described.

My invention lies mostly in the general principles underlying the device used to reveal it and only to a small extent in the physical structure thereof, which is, therefore, susceptible to many variations without departing from said invention.

I therefore wish to claim

1. In a wire winding machine, a reversible traverse mechanism comprising a double disc and roller assembly, a traverse element for guiding the wire being wound driven by said roller, a transfer element for oscillating the said roller from one disc to the other to effect reversal of movement of the traverse element, a shipper actuating said transfer element, stops upon said shipper arranged to be contacted by said traverse element.

2. In a winding machine having a reversible traverse element, means for imparting an initial motion to said traverse element consisting of an actuating wheel mounted upon a shaft, a lead screw driven by said shaft but movable longitudinally independent thereof, elements connecting said lead screw to said traverse element, an oscillating transfer element for effecting reversal of movement of the traverse element, an adjustable lever associated with said transfer element, a connection from the said lead screw to said adjustable lever, whereby when the transfer element is moved the lead screw will be moved along its supporting shaft, the adjustment of said lever permitting the amplitude of the motion imparted to the lead screw to be varied.

3. In a wire winding machine a feeding mechanism that includes a double friction disc-roller assembly, a shaft supporting said roller, an oscillating bearing supporting said shaft, traverse means for guiding the wire while being wound, a transfer lever for shifting said oscillating bearing to reverse the traverse means, one arm of said lever being composed of a pair of pretensioned springs.

4. In a winding machine traverse elements combining a carriage, a lead screw, a rotatably mounted carriage nut coupling said lead screw and said carriage, and means for restraining the rotation of said nut consisting of a spring attached to said carriage arranged to press on a portion of said nut.

5. In a wire winding machine, having reversible traverse elements for guiding the wire as it is being wound, adjustable means for causing an initial start back of said traverse elements as the end of a movement thereof in one direction is reached, consisting of an oscillating transfer lever, an adjusting screw mounted upon said lever, a nut moved by said screw, a connecting rod, a thrust bearing, said rod connecting said nut and bearing, and a longitudinally movable lead screw restrained by said thrust bearing, but movable longitudinally when the thrust bearing is moved, said adjusting screw being so placed upon said transfer lever that it acts as a lever for moving the thrust bearing, the effective length of which may be altered by turning said screw causing said nut to approach or recede from the center of oscillation of said transfer lever substantially as described.

6. In a wire winding machine, having reversible traverse elements for guiding the wire as it is being wound, adjustable means for causing an initial start back of said traverse elements as the end of a movement thereof in one direction is reached, consisting of an oscillating transfer lever, an adjusting screw mounted upon said lever, a nut moved by said screw, a connecting rod, an oscillating lever supporting a thrust bearing, a thrust bearing, said rod connecting said nut and oscillating lever, and a longitudinally movable lead screw restrained by said thrust bearing, but movable longitudinally when the thrust bearing is moved, said adjusting screw being so placed upon said transfer lever that it acts as a lever for moving the thrust bearing, the effective length of which may be altered by turning said screw causing said nut to approach or recede from the center of oscillation of said transfer lever.

7. In a winding machine, the combination of means for winding wire, an adjustable disc-roller feeding element, means for coupling said winding means and feeding element, that said feeding element may be operated simultaneously with said winding means, a lead screw coupled to the said feeding element, a lead screw nut, a traverse element that carries said lead screw nut, said traverse element being actuated by the feeding element through said lead screw nut, the nut being rotatable in said traverse element upon the lead screw, and means for yieldingly holding the nut against rotation in its mounting, whereby operation of the feeding element causes positive movement of the traverse element, and the traverse element may be spotted at will by turning the nut against its yielding holding means.

8. In a winding mechanism the combination of a rotary motor, the driven shaft of which projects beyond the ends thereof in opposite directions, a support on which the wire is wound, carried by the shaft projecting from one end of the motor, an adjustable disc roller reversing drive element connected with the shaft projecting from the other end of the motor, a wire guide for laying the wire on the support, a lead screw driven directly by the roller member of the drive element and a traverse carriage on the lead screw connected with and moving the wire guide, the lead screw being parallel with the driven shaft of the motor and located close to the motor side.

9. In a winding mechanism the combination of a rotary motor, the driven shaft of which projects beyond the ends thereof in opposite directions, a support on which the wire is wound, carried by the shaft projecting from one end of the motor, an adjustable disc-roller reversing drive element connected with the shaft projecting from the other end of the motor, a wire guide for laying the wire on the support, a lead screw driven directly by the roller member of the drive element, a traverse carriage on the lead screw connected with and moving the wire guide, the lead screw being parallel with the driven shaft of the motor and located close to the motor side, and means for imparting to the traverse element an initial start back motion as its direction of movement is changed.

10. In a winding mechanism the combination of a rotary motor, the driven shaft of which projects beyond the ends thereof in opposite directions, a support on which the wire is wound, carried by the shaft projecting from one end of the motor, an adjustable disc-roller reversing drive element connected with the shaft projecting from the other end of the motor, a wire guide for laying the wire on the support, and a lead screw driven directly by the roller member of the drive element, a traverse carriage on the lead screw connected with and moving the wire guide, the lead screw being parallel with the driven shaft of the motor and located close to the motor side, means for imparting to the traverse element an initial start back motion as its direction of movement is changed and means for manually imparting movement to the traverse element independent of the motion imparted thereto by the operation of the lead screw, for the purpose of spotting the wire guide.

11. In a wire winding machine the combination with means for rotating a support upon which the wire is wound and a guide for laying the wire in spiral layers upon the support, of an adjustable pitch feeding element for moving the wire guide consisting of a pair of friction discs spaced apart upon a driven shaft and a roller engageable with and driven by the said discs, a shaft upon which the roller is mounted, bearings supporting said shaft, in one of which, located near the roller, the shaft is slidable, such bearing being pivotally supported so it may be swung to cause the roller to engage with one or the other of the discs between which it lies and a thrust bearing for the end of the shaft distant from the roller and supported to move therewith as the shaft is longitudinally adjusted in its swinging bearing.

12. In a winding machine the combination of means for winding wire, guiding means for laying the wire while being wound, a traverse element for operating the guiding means, a shipper mechanism for changing the direction of movement of the traverse element as the courses of wire being laid are completed, means for operating the shipper mechanism from the traverse element and means for translating the slow motion of the traverse element to a short instantaneous motion as the laying of a course of wire is completed, such means including a trigger latch for holding the shipper mechanism while a course of wire is being laid, means operated at the conclusion of a movement of the traverse element in one direction for tripping the latch and a transmission spring coacting with the shipper and the tripping means, said latch holding the shipper mechanism while the spring is being tensioned and the spring operating to move the traverse element with a short snapover action when the trigger is tripped.

13. In a wire feeding mechanism, in combination a reversing mechanism comprising a pair of friction discs between which is located an oscillating friction wheel, an oscillating mounting for said wheel, a transfer element for moving the oscillating mounting for the friction wheel, a shipper for operating with a snap-over action to move the transfer element and transmission springs between the transfer element and the shipper.

14. The combination recited in claim 13 wherein the transmission springs are pretensioned to a degree required to press the friction wheel against the friction disc with the desired force.

15. In a winding machine, the combination of means for winding the wire upon a support, an adjustable disc-roller reversing element, a shaft supporting the roller member of the said reversing element, movably supported so the roller may be adjusted to effect change of speed, a lead screw coaxial with the shaft and rotated thereby but free to have a limited longitudinal movement thereon, a traverse element operated by the lead screw for controlling the laying of the wire that is being wound, and means for imparting to the lead screw and traverse element an initial start back motion, without moving the shaft on which the lead screw is supported, at the moment the direction of motion of the traverse element is changed.

16. The combination stated in claim 15 including means for effecting a reversal of movement of the traverse element and a connection between said reversing means and the lead screw whereby the latter is given a short longitudinal movement when the reversal means are operated.

PENROSE E. CHAPMAN.